Nov. 5, 1963   P. MUCHNICK   3,109,981
OVER-VOLTAGE PROTECTIVE CIRCUIT
Filed June 24, 1960

PAUL MUCHNICK
INVENTOR

BY Ralph E. Bitner
ATTORNEY

United States Patent Office 3,109,981
Patented Nov. 5, 1963

3,109,981
OVER-VOLTAGE PROTECTIVE CIRCUIT
Paul Muchnick, Norwalk, Conn., assignor, by mesne assignments, to Raytheon Company, a corporation of Delaware
Filed June 24, 1960, Ser. No. 38,535
2 Claims. (Cl. 323—22)

This invention relates to an over-voltage protective circuit for use with direct current supplies. The invention has particular reference to a circuit which acts immediately to limit the output voltage whenever the input or output voltage exceeds a predetermined value. The protective circuit may be used with or without a voltage regulator circuit.

Voltage regulator circuits comprising a sensing circuit with a voltage reference and a variable passing impedance can be made to control all the usual normal voltage swings which may be found in a direct current supply which comes from a battery or a direct current generator. However, there are times when excessive voltage pulses are supplied to the supply terminals and if these voltage surges are considerably in excess of the usual voltage variations, they may damage many of the components in the regulator circuit and also damage the load.

The present protective circuit is designed to take care of these excessive voltage surges and protect the load and other circuit components from damage.

One of the objects of this invention is to protect an improved protective circuit which avoids one or more of the disadvantages and limitations of prior art arrangements.

Another object of the invention is to protect a load circuit when the input voltage is increased by a large amount.

Another object of the invention is to protect the transistor components in a regulator circuit from excessive currents and high temperatures.

Another object of the invention is to protect circuit components by a protective circuit which does not draw appreciable power from the circuit during normal operation.

Another object of the invention is to increase the speed of response to a sensed over-voltage pulse. The speed of response is much faster than that obtained by a fuse or a gas-filled discharge device.

The invention comprises a protective circuit for a direct current supply of electric power and employs a sensing circuit connected across the load or input terminals. The error voltage derived from the sensing circuit is amplified by a direct current amplifier and applied to a transistor which lowers the voltage across the load. The protective circuit is reserved for over-voltage pulses above a predetermined maximum and during normal operation all components of the protective circuit absorb a minimum amount of power.

One feature of the invention includes a sensing circuit which is connected across the direct current supply terminals instead of the load terminals.

For a better understanding of the present invention, together with other and further objects thereof, reference is made to the following description taken in connection with the accompanying drawings.

In actual practice, either protective circuit may be used with or without a voltage regulator.

Figure 1:
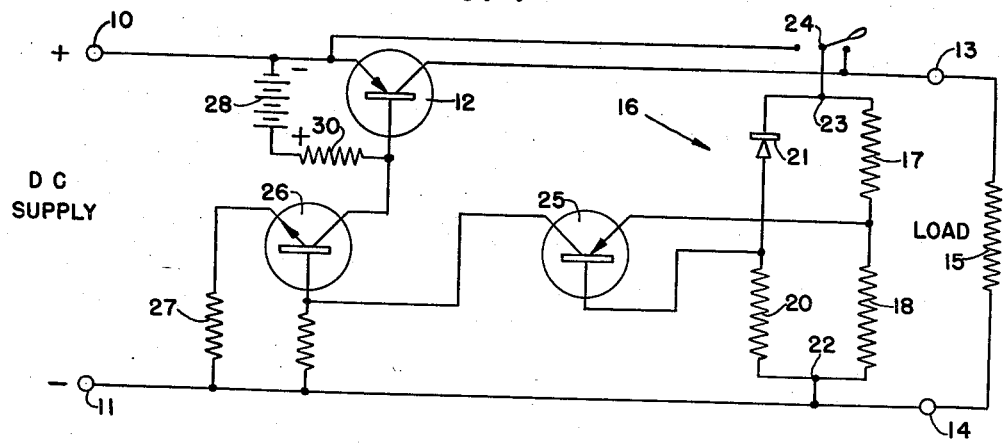
FIG. 1 is a schematic diagram of connections of the preferred form of the invention and shows the protective circuit used without a voltage regulator.

Referring now to the drawings, the circuit in FIG. 1 includes a pair of input terminals 10, 11, which are to be connected to a direct current supply which may vary considerably in applied voltage. A passing transistor 12 is connected in series between input terminal 10 and an output terminal 13. Current passing between terminals 10 and 13 pass through the emitter and collector electrodes of the transistor. A second load terminal 14 is connected directly to input terminal 11 and a load 15 is connected to the load terminals.

A sensing circuit 16 is provided for determining an error voltage which is above or below a desired predetermined voltage value. Many different kinds of sensing circuits can be used, the one shown in FIG. 1 being a preferred type and includes a bridge circuit having arms 17, 18, and 20 comprising resistor elements and a fourth arm 21 comprising a zener diode. This form of sensing bridge is old in the art and has been described in prior publications.

One junction point 22 of the sensing circuit is connected to the common conductor which joins terminals 11 and 14 while the other junction point 23 is connected to the central terminal of a single pole double-throw switch 24. This switch may connect junction point 23 to the output terminal 13 or to the input terminal 10 depending upon the operation desired.

The other two junction points of the sensing bridge are connected to the base and emitter electrodes of a transistor 25 which acts as the first stage of a direct current amplifier. The second stage of this amplifier includes a transistor 26 which has its base connected to the collector of transistor 25, its emitter is connected in series with a resistor 27 to the common conductor and its collector is connected to the base of passing transistor 12. Transistor 12 has a source of reversed bias connected between its emitter and base. This source includes a potential, such as battery 28 and a series limiting resistor 30. This bias circuit maintains transistor 12 in a nonconductive condition when no other current or voltage is applied to its base.

The operation of this circuit will first be described with the blade of switch 24 connected to the left so that the sensing circuit is across the input terminals. In this condition the normal variations of voltage will be sensed by the sensing circuit and variations of an error voltage will be amplified by transistors 25 and 26 and applied to the base of transistor 12, driving the transistor to saturation.

Now let it be assumed that high voltage is applied to input terminals 10 and 11 and that the high voltage is in excess of the predetermined value. If this circuit is connected to a regulated supply the high voltage might be due to a malfunction of the regulator. The high voltage is sensed by the sensing circuit and its output is amplified by transistors 25 and 26 so as to reduce the applied current on transistor 12, permitting the bias supply to take over and increase the impedance of transistor 12 to place it in a substantially nonconducting condition. This produces a high voltage drop across transistor 12 and reduces the voltage applied to the output load terminals to a very low value. This condition is maintained as long as the high voltage is applied to terminals 10 and 11. When the input voltage is reduced to a normal value, the output voltage again assumes its normal value without manual operation of any kind.

If switch 24 is thrown to the right so that the sensing circuit 16 is applied to output terminals 13 and 14, the operation is substantially the same as described above for all normal output voltages. When an excess voltage appears across the output terminals 13 and 14, the sensing circuit produces an error signal to operate the amplifiers as before to cut off transistor 12. However, the impedance of transistor 12 rises only to such a value as to maintain the output voltage at the predetermined desired level. This condition is maintained until the applied excess voltage falls below the excess voltage level.

Figure 2:
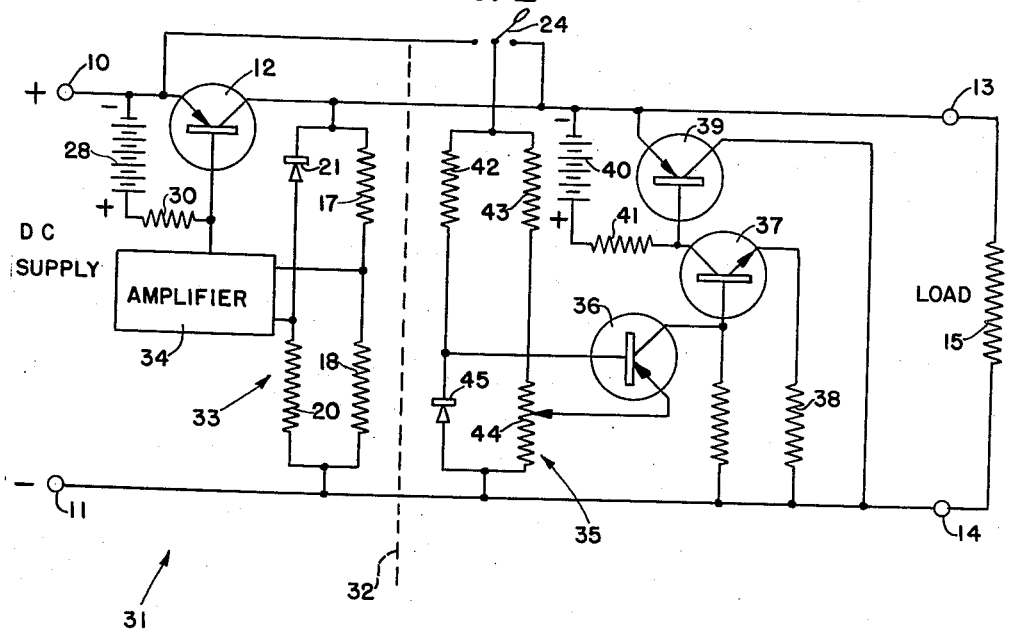
FIG. 2 is a schematic diagram of connections showing an alternate form of the protective circuit used in connection with a voltage regulator circuit.

The circuit shown in FIG. 2 has input terminals 10 and 11 and output terminals 13 and 14, as before, with a load 15. This circuit contains a voltage regulator circuit 31 to the left of dotted line 32. This voltage regulator circuit includes the usual sensing circuit 33, amplifier 34, and a passing transistor 12 which may be similar to the passing transistor shown in FIG. 1 and having a bias source of potential 28 in series with a limiting resistor 30. The protective portion of this circuit is shown to the right of line 32 and includes a sensing circuit 35 which may be connected by means of switch 24 to the output terminals 13, 14, or to the input terminals 10, 11. The opposite junction points of this sensing circuit are connected to the base and emitter electrodes of a transistor 36 which forms the first stage of a direct current amplifier. The second stage of the amplifier includes transistor 37 having its base connected to the collector electrode of transistor 36 and its emitter connected to the negative common conductor (through resistor 38). The collector of transistor 37 is connected to the base of a third stage transistor 39 whose emitter is connected to terminal 13 and whose collector is connected to output terminal 14. Transistor 39 has its base biased by a source of potential 40 which is connected between its emitter and its base in series with a resistor 41. The potential of source 40 and the other connections of transistors 36, 37, and 39 are such that for all normal values of voltages applied to the input terminals these transistors will not conduct current and therefore do not absorb power from the output terminals.

The sensing circuit 35 is similar to the other two sensing circuits shown in FIGS. 1 and 2 and include three resistors 42, 43, and 44 and a zener diode 45.

The operation of this circuit is as follows: With the switch arm of switch 24 thrown to the left as shown in FIG. 2 and with the bias potential 40 applied to the direct current amplifier, the circuit functions as a normal voltage regulator with all the circuit components to the left of line 32 operating in a well-known manner to maintain the voltage across output terminals 13, 14, and the load 15 at a predetermined desired voltage. During normal operation the transistors to the right of line 32 do not conduct. Now let it be assumed that an excessive voltage is applied to the input terminals 10 and 11. This voltage is sensed by circuit 35 and applied to transistors 36, 37, and 39 overriding the biasing voltage of potential source 40 and causing transistor 39 to become conductive and to form a low resistance path across terminals 13, 14. The output voltage is reduced because of the series resistance in transistor 12 and the inherent resistance in the source of supply. This action prevents excessive voltages from reaching the regulator and load, the result being that high voltages impressed on the input terminals lower the voltage across the regulator input terminals and the output terminals to a value that has been predetermined or lower. This action is designed to take care of any unusual conditions that may exist in the source of supply. The action continues for sustained overvoltages until a fuse or circuit breaker in series with terminal 10 opens.

Now let it be assumed that the switch blade in switch 24 is thrown to the right thereby connecting sensing circuit 35 across the output terminals. The action of this circuit is similar to that described above except that the high voltage is sensed across the output terminals and the action of transistor 39 in short-circuiting the output terminals is limited to an output voltage which is not less than the predetermined output voltage. This latter connection may be a combination of the usual voltage regulator circuit 31 and an auxiliary protective circuit which is operated only when excessive input voltages are received from the source or when a component in circuit 31 fails.

The protective circuit described above may act alone to protect an output load circuit or it may be used in conjunction with a voltage regulator to operate only during excessive voltage input or output surges.

The foregoing disclosure and drawings are merely illustrative of the principles of this invention and are not to be interpreted in a limiting sense. The only limitations are to be determined from the scope of the appended claims.

I claim:

1. An over-voltage protective circuit for direct current power supplies comprising a pair of input terminals for connection to a direct current supply, a pair of output terminals for connection to a load, a passing transistor having base, emitter, and collector electrodes, said emitter electrode being connected to one of said pair of input terminals, and said collector electrode being connected to one of said pair of output terminals, a voltage sensing circuit connected across said input terminals, a fixed bias circuit connected between the emitter and base electrodes of said passing transistor, said fixed bias circuit providing a bias to back bias said passing transistor, and an amplifier circuit having an input circuit connected to said sensing circuit and an output circuit connected to said base electrode of said passing transistor, said amplifier circuit providing a current during the sensing of normal voltage at the input terminals to overcome the back bias of said passing transistor provided by said fixed bias thereby forward biasing said passing transistor, and said amplifier circuit providing a reduced current upon the sensing of an over-voltage at said input terminals to permit said fixed bias to back bias said base electrode with respect to said emitter electrode of said passing transistor thereby reducing the conduction of said passing transistor.

2. An over-voltage protective circuit for direct current power supplies comprising a pair of input terminals for connection to a direct current supply, a pair of output terminals for connection to a load, a passing transistor having base, emitter, and collector electrodes, said emitter electrode being connected to one of said pair of input terminals, and said collector electrode being connected to one of said pair of output terminals, a voltage sensing circuit connected across said output terminals, a fixed bias circuit connected between the emitter and base electrodes of said passing transistor, said fixed bias circuit providing a bias to back bias said passing transistor, and an amplifier circuit having an input circuit connected to said sensing circuit and an output circuit connected to said base electrode of said passing transistor, said amplifier circuit providing a current during the sensing of normal voltage at the output terminals to overcome the back bias of said passing transistor provided by said fixed bias thereby forward biasing said passing transistor, and said amplifier circuit providing a reduced current upon the sensing of an over-voltage at said output terminals to permit said fixed bias to back bias said base electrode with respect to said emitter electrode of said passing transistor thereby reducing the conduction of said passing transistor.

References Cited in the file of this patent

UNITED STATES PATENTS

| | | |
|---|---|---|
| 2,693,568 | Chase | Nov. 2, 1954 |
| 2,832,900 | Ford | Apr. 29, 1958 |
| 2,841,757 | Shields | July 1, 1958 |
| 2,889,512 | Ford et al. | June 2, 1959 |
| 2,971,102 | Schultz | Feb. 7, 1961 |